(12) United States Patent
McFall (10) Patent No.: US 6,179,021 B1
(45) Date of Patent: Jan. 30, 2001

(54) LOADING SYSTEM WITH MOVABLE DIVIDER MECHANISM

(76) Inventor: Robert M. McFall, Box 1282, Clintwood, VA (US) 24228

( * ) Notice: Under 35 U.S.C. 154(b), the term of this patent shall be extended for 0 days.

(21) Appl. No.: 09/419,961

(22) Filed: Oct. 18, 1999

(51) Int. Cl.⁷ ...................................................... B65B 1/04
(52) U.S. Cl. ........................................... 141/248; 141/129
(58) Field of Search ..................... 141/248, 250, 141/270, 231, 232, 233, 178, 179, 129

(56) References Cited

U.S. PATENT DOCUMENTS

| | | |
|---|---|---|
| 3,002,637 | 10/1961 | Miller . |
| 3,139,997 | 7/1964 | Merritt et al. . |
| 3,842,994 | 10/1974 | Theurer et al. . |
| 4,678,015 * | 7/1987 | Raque et al. ........................ 141/131 |
| 5,098,248 | 3/1992 | McFall . |
| 5,353,850 * | 10/1994 | Ueda et al. ......................... 141/129 |

* cited by examiner

Primary Examiner—Steven O. Douglas
(74) Attorney, Agent, or Firm—Michael E. McKee (57) ABSTRACT

A material transfer system for loading a pair of spaced, open-topped receptacles with a material capable of gravitationally flowing toward the open-topped receptacles from a source along a material flow path having a segment along which the material falls downwardly utilizes an elongated support frame mounted adjacent the receptacles and a divider mechanism which is positionable in vertical registry with and thereby covers the spacing defined between the two receptacles. A motor is drivingly connected to the divider mechanism for moving the mechanism along the length of the support frame and into a position at which the divider mechanism is positionable in vertical registry with the segment of the material path through which the material falls downwardly. Therefore, when the spacing defined between the receptacles is moved into vertical registry with the segment of the material flow path through which the material falls downwardly, the divider mechanism is also positionable in registry with the segment of the material flow path through which the material falls downwardly so that the material is prevented from falling into the spacing by the divider mechanism.

22 Claims, 8 Drawing Sheets

LOADING SYSTEM WITH MOVABLE DIVIDER MECHANISM

BACKGROUND OF THE INVENTION

This invention relates generally to loading systems used for loading a fluid-like substance, such as crushed coal or other particulate material or liquids, into transport receptacles, such as intermediary dump cars designed to load railroad cars, and is more particularly concerned with such a loading system wherein the intent is to increase the loading capacity of conventional load outs where the railroad cars are pulled, pushed or dropped under the load point thus leaving empty a substantial portion of the space available for parking empty railroad cars. With a system using the herein-described invention, the cars can be parked and loaded while stationary providing the added benefit of increased load out capacity without concern as to whether the track is straight or curved. In addition, the position of the load point or points is of no particular concern with the herein-described invention. Furthermore, the system is concerned with the loading of a fluid-like substance that is gravitationally directed into a plurality of receptacles for transport.

In my U.S. Pat. Nos. 5,839,565, 5,098,248 and 4,988,253 wherein machines are described which increase load out capacity through the negotiating of curvature, there are depicted load points which are movable and overall reversible. These machines depend upon the use of a belt for the transport of material whereas the invention described herein, also reversible, can be utilized unhindered by belting that must be contained and propelled about substantially the length of the loading machine. Although the invention described herein could be used with the machines of the referenced patents, these machines are mentioned here primarily as examples of belt carrying machines with movable load points. A movable load point, not necessarily associated with the machines of the referenced patents, may be desirable wherein the invention described herein remains under the load point for a greater period of time so as to more greatly fill the receptacles moving therebelow without decreasing the receptacle speed.

To load the aforementioned intermediary dump cars, for example, without shutting off the flow of material and avoiding the dropping of that material into the spacing defined between the two intermediary dump cars, the invention described herein is positioned in registry with the segment or space existing between the intermediary dump cars or receptacles to interrupt or divert the material falling downwardly so that the material is prevented from falling into the spacing by the divider mechanism and thus forced into one or the other or both receptacles or dump cars.

In a gondola-including machine described in my U.S. Pat. No. 4,793,462, there exists overlay between gondolas provided for by each gondola. This, too, prevents spillage between gondolas or receptacles. In the invention described herein, the advantage is that gondolas or receptacles can be built without the need of overlay into each gondola or receptacle thereby resulting in tremendous cost savings when dealing with a great number of gondolas or receptacles.

Accordingly, it is an object of the present invention to provide a new and improved means or system for loading open-topped receptacles with particulate material which is gravitationally directed toward the receptacles from a source or sources.

One more object of the present invention is to provide such a means or system of reduced complexity and increased flexibility for increasing load out capacity.

Another object of the present invention is to provide such a means or system which increases the speed and efficiency with which a plurality of spaced, open-topped receptacles can be loaded.

Still another object of the present invention is to provide such a new and improved means or system which enables spaced, open-topped receptacles to be loaded from a load source or sources while the receptacles are in motion.

A further object of the present invention is to provide such a means or system that allows complete flexibility of dumping destination or destinations while at the same time being uncomplicated in construction yet effective in operation.

A still further object of the present invention is to provide such a movable divider whose size can be adjusted for use, perhaps, with complicated loading environments.

SUMMARY OF THE INVENTION

This invention resides in a material transfer system for loading a pair of spaced receptacles with a material capable of gravitationally flowing toward the receptacles from a source and wherein the material which is gravitationally directed toward the receptacles moves along a path between the source and the receptacles which has a segment through which the material falls downwardly. In addition, the spaced receptacles to be loaded define a spacing therebetween which is movable into vertical registry with the segment of the material flow path through which the material falls downwardly.

The transfer system includes an elongated support frame mounted adjacent the receptacles and a divider mechanism providing two downwardly-directed flow-directing surfaces which are joined together at an apex and which diverge from one another as paths are traced along the flow-directing surfaces. Each flow-directing surface terminates at a discharge end from which material which falls upon the flow-directing surfaces is permitted to fall therefrom and move toward one of the receptacles to be loaded. The system also includes means for mounting the divider mechanism along the support frame for movement along the length thereof and into and out of a position at which the divider mechanism spans and thereby covers the spacing defined between the two receptacles. Means are also included for moving the divider mechanism along the length of the support frame and into a position at which the divider mechanism is positionable in vertical registry with the segment of the material path through which the material falls downwardly so that when the spacing defined between the receptacles is moved in vertical registry with the segment of the material flow path through which the material falls downwardly, the divider mechanism is positionable in registry with the segment of the material flow path through which the material falls downwardly so that the material is prevented from falling into the spacing by the divider mechanism.

BRIEF DESCRIPTION OF THE DRAWINGS

FIG. 14b is a schematic side view of a cylinder and ram arrangement of the FIG. 14 embodiment as seen generally from the left in FIG. 14a.

DETAILED DESCRIPTION OF THE ILLUSTRATIVE EMBODIMENTS

Figure 1:
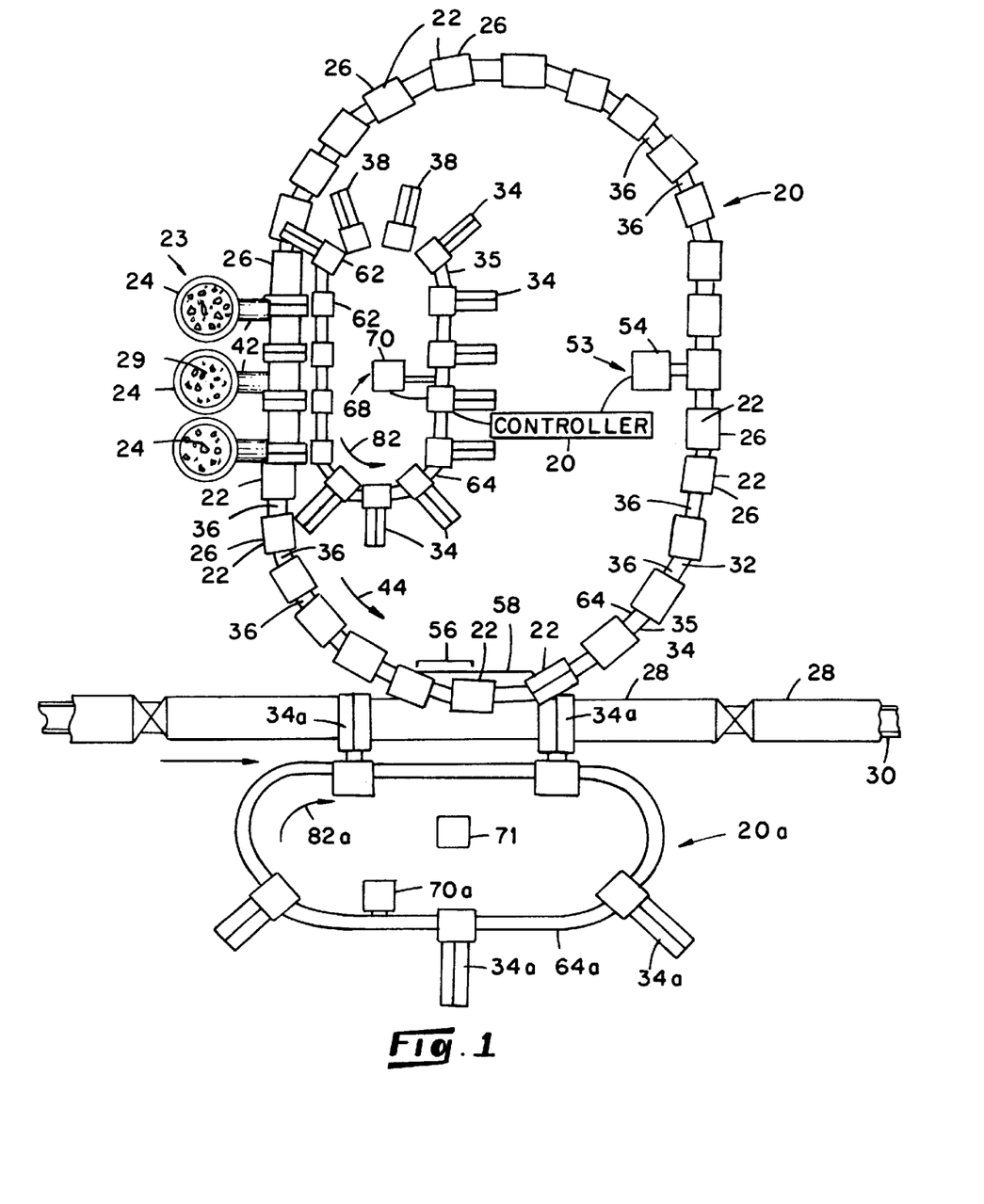
FIG. 1 is a plan view of a coal-loading site illustrating schematically an embodiment of a coal-loading system which employs divider mechanisms during a coal-loading operation using moving or intermediately moving railway cars in a unit-train loading operation.
Figure 2:
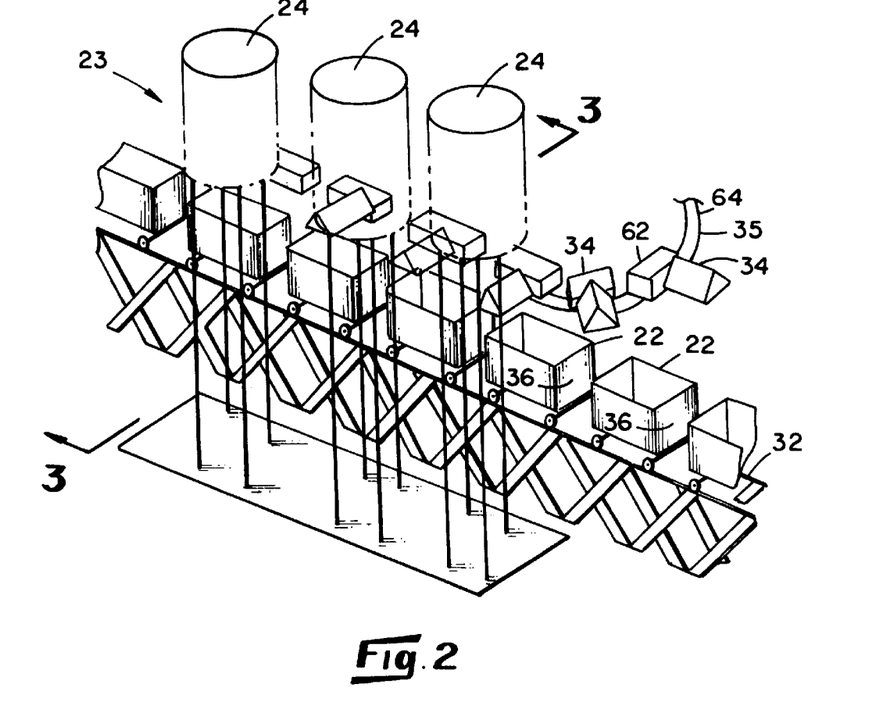
FIG. 2 is a perspective view of a fragment of the FIG. 1 embodiment.

Turning now to the drawings in greater detail, there is shown in FIGS. 1 and 2 an embodiment of a system, generally indicated 20, for loading a line of spaced, open-topped receptacles 22 with particulate material capable of gravitationally flowing downwardly toward the open tops of the receptacles 22 from an overhead source 23. The depicted embodiment 20 is illustrated as being used in a coal-transporting environment in which crushed coal 29 is dispensed from a plurality (i.e. three) of hoppers 24 into a line of segmented dumper cars 26 for transport of the coal 29 to railway cars 28 moving along on a siding 30. The dumper cars 26 form an endless loop of open-topped receptacles 22, 22 and are rollably mounted along a guideway 32 for movement therealong as the open tops of the dumper cars 26 are passed beneath the hoppers 24 for accepting coal discharged therefrom. The loading system 20 also includes a plurality of divider mechanisms, or dividers, 34 which are connected together for joint movement along a guideway 35. As will be apparent herein, dividers 34 are movably supported above the dumper cars 26 and are positioned in registry with a corresponding spacing, indicated 36, defined between adjacent dumper cars 26 as the dumper cars 26 move beneath the hoppers 24 so that coal which is discharged from the hoppers 24 is prevented from falling into the spacing 36 defined between each pair of adjacent dumper cars 26.

Figures 3, 4, 5, 6:
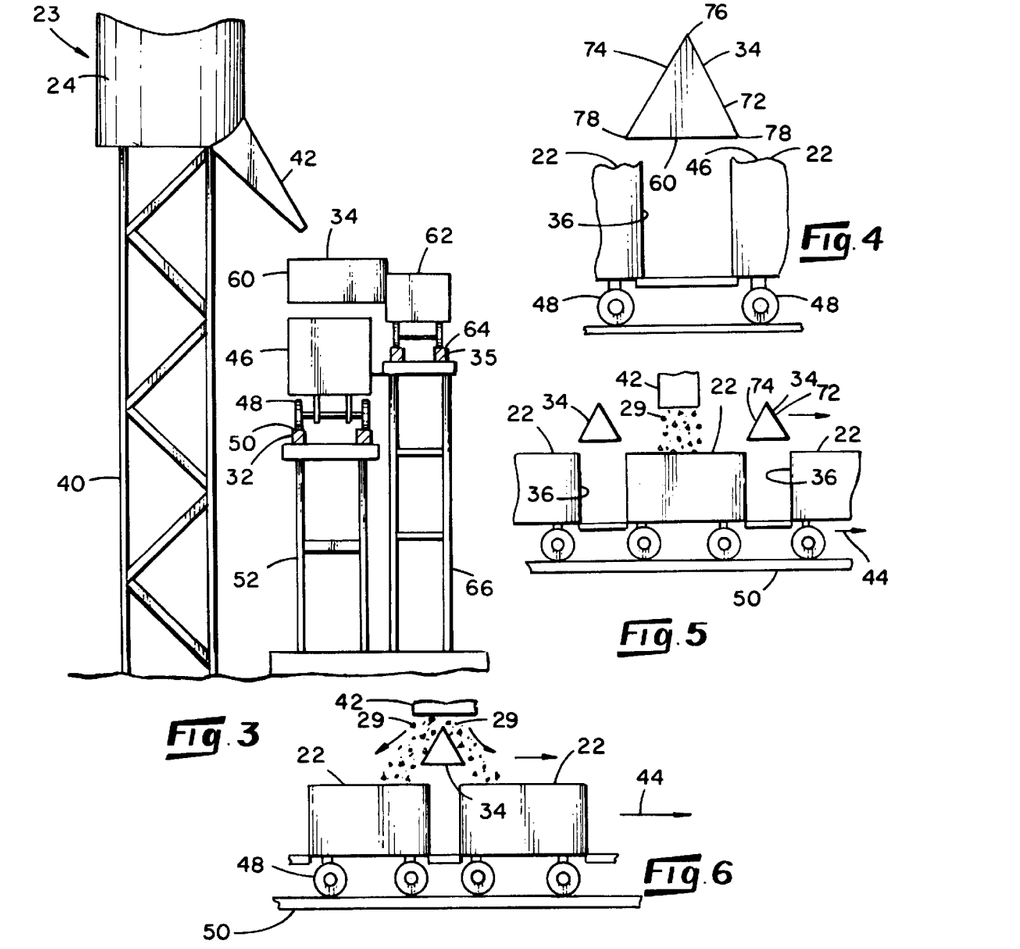
FIG. 3 is a cross-sectional view taken about along line 3—3 of FIG. 2.
FIG. 4 is a side elevational view of a fragment of the divider mechanism and dumper cars as seen generally from the left in FIG. 3.
FIGS. 5 and 6 are side elevational views, similar to that of FIG. 4, of a fragment of the FIG. 1 embodiment illustrating relative positions between the divider mechanisms and dumper cars of the FIG. 1 embodiment as the divider mechanisms and dumper cars are moved in sequence beneath the discharge chute of a hopper.

With reference to FIGS. 1–3, the hoppers 24 are arranged generally in a line, and each hopper 24 is supported in an elevated condition above the dumper cars 26 by suitable support framework 40 and includes a discharge chute 42 at the lower end thereof through which coal 29 is discharged from the hopper 24 and gravitationally falls toward the dumper cars 26. Since the dumper cars 26 of the depicted FIG. 1 environment are passed in sequence beneath the discharge chutes 42 during a coal-loading operation, each hopper discharge chute 42 provides a load point at which coal is accepted by the dumper cars 26. Multiple loading points may be more advantageous than a single loading point in the instances in which the dumper cars 26 are desired to move along its guideway 32 at a relatively high rate of speed.

With reference to FIGS. 1, 3 and 4, each dumper car 26 includes a receptacle body 46 and a wheeled truck assembly 48 upon which the receptacle body 46 is mounted, and the guideway 32 along which the cars 26 are mounted is in the form of an endless, somewhat oval track 50 upon which the wheels of the wheeled truck assembly 48 are adapted to rollably move. The endless track 50 is supported in an elevated condition above the railway cars 28 by suitable framework 52 (FIG. 3) so that when dumped from the dumper cars into the railway cars 28, the coal 29 is permitted to gravitationally fall into the tops of the railway cars 28 moving along the siding 30. In addition, the dumper cars 26 are connected together by way of, for example, hitch pins which pivotally join the wheeled truck assemblies 48 together so that the cars 26 can be moved together in an endless line along the track 50 and pivot relative to one another in order to navigate the curves along the track 50.

For moving the dumper cars 26 along the track 50 in the direction of the FIG. 1 arrow 44, the system 20 includes motive means 53 including a reversible, variable-speed motor 54 mounted in a stationary relationship relative to the framework 52 and connected in driving relationship with the cars 26 so that actuation of the motor 54 forcibly moves the cars 26 along the track 50. Known schemes exist which effect the dumping of the cars 26 upon reaching a dump region, indicated 56 in FIG. 1) located adjacent the railway cars 28. One such scheme includes a mechanical scheme, indicated generally 58 in FIG. 1, which mechanically tips, so as to unload, the receptacle body 46 of each dumper car 26 relative to its corresponding wheeled truck assembly 48 and then return the receptacle body 46 to its upright position when the dumper car 26 is moved out of the dump region 56. An alternate dumping scheme can employ a canted length of track along the dump region 56 and attending means for holding the wheels of the truck assembly 48 against the track 50 so that as the dumper cars 26 move through the canted length of track, the dumper cars 26 are bodily tipped over to dump the contents contained therein and subsequently returned to an upright condition for continued movement along the track 50. Since the loading system 20 described herein is intended to be used for loading the dumper cars 26 as the cars 26, 26 are continually moved along the track 50, any car-dumping scheme employed within the loading system 20 must be capable of dumping the dumper cars 26 as the cars 26 continue to move along the track 50.

Each divider 34 includes a wedge-shaped body 60, as best shown in FIG. 4, which is attached to the body of a wheeled carriage 62 which is, in turn, rollably mounted upon the guideway which is provided by an endless, oval track 64 (best shown in FIG. 1). The track 64 is suitably supported in an elevated condition above the dumper car track 50 by suitable support framework 66 (best shown in FIG. 3), and the wheeled carriages 62 are pivotally connected together in an endless arrangement along the track 64. For moving the carriages 62, and thus the dividers 34, along the track 64, in the direction of the FIG. 1 arrow 82, the system 20 includes motive means 68 including a reversible, variable-speed motor 70 mounted in a stationary relationship relative to the framework 66 and connected in driving relationship with the carriages 62 so that actuation of the motor 70 forcibly moves the carriages 62 along the track 64.

With reference again to FIG. 4, the wedge-shaped body 60 of each divider 34 provides two downwardly-directed flow-directing surfaces 72, 74 which are joined together at an apex 76 and which diverge from one another as paths are traced downwardly along the flow-directing surfaces 72, 74, and each flow-directing surface 72 or 74 terminates at a discharge end 78 from which coal which falls upon the flow-directing surface 72 or 74 is permitted to fall from the divider 34. In addition, the body 60 of each divider 34 is connected to the body of a corresponding wheeled carriage 62 so as to be cantilevered to one side of the carriage 62. Since the dividers 34 are intended to be positioned over so as to span the width of a spacing 36 provided between adjacent dumper cars 26, the carriage-supporting track 64 is positioned above and to one side of the dumper car track 50 so that each divider 34 is capable of being positionable in registry with a corresponding spacing 36 provided between adjacent dumper cars 26 as the cars 26, 26 are passed beneath the hopper discharge chutes 42. Furthermore, the distance between apexes 76 of adjacent dividers 34 corresponds to the distance as measured between the centers of adjacent dumper car spacings 36 so that as long as one divider 34 is positioned across a spacing 36 provided between adjacent dumper cars 26 being moved beneath the hopper discharge chutes 42, subsequent dividers 34 which are moved beneath the chutes 42 also span corresponding spacings 36 provided between adjacent dumper cars 26.

During a coal-loading operation, the dumper cars 26 are moved along the track 50 so that the open tops of the receptacle bodies of the cars 26 pass directly beneath the hopper chutes 42. At the same time, the dividers 34 are moved along the corresponding track 64 so that as they pass beneath hopper chutes 42 as shown in FIG. 3, the dividers 34 span the spacing 36 provided between adjacent dumper cars 26. To this end, the dividers 34 move along the corresponding track 64 at about the same speed that the dumper cars 26 move along the corresponding track 50. To coordinate the speeds of the dumper cars 26 and dividers 34, a computer controller 80 (FIG. 1) can be employed and appropriately connected between the motors 54 and 70.

The purpose and operation of the dividers 34 can be best understood with reference to FIGS. 5 and 6 which illustrate the position of a divider 34 relative to a hopper chute 42 as two dumper cars 26 are passed in sequence beneath the chute 42. In this connection, as long as the open top of a dumper car 26 is positioned in vertical registry with the chute 42 (as viewed in FIG. 5), the divider 34 does not interfere with the flow of coal 29 from the chute 42 so that the coal 29 is permitted to gravitationally fall (along a substantially vertical path) into the dumper car 26 positioned therebelow. However, as the spacing 36 defined between two adjacent dumping cars 26 moves into vertical registry with the chute 42 (as viewed in FIG. 6), the divider 34 diverts the flow of coal falling from the chute 42 so that the coal is directed into the front, or leading, dumper car 26 or into the rearward, or trailing, dumper car 26. More specifically, any coal 29 which falls onto one (or the leading) flow-directing surface 72 is directed therealong and off of the discharge end 78 thereof into the leading dumper car 26, and any coal which falls into the other (or the trailing) flow-directing surface 74 is directed therealong and off of the discharge end 78 thereof into the trailing dumper car 26. Consequently, the dividers 34 permit coal to be continuously discharged from the hoppers 24 as the dumper cars 26 (and dividers 34) are continuously moved beneath the chutes 42.

Features of the depicted system 20 include the independency of movement between the dividers 34 and the open-topped receptacles 22 being filled during a coal-loading operation and the capacity of the dividers 34 (by way of the motor 70) to reverse direction along the track 64. For example, with the motive means 68 capable of moving the dividers 34 along the track 64 independently of the operation and speed of the dumper cars 26 along the corresponding track 50 provides flexibility in a coal-loading operation and enables the dividers 34 to be moved at different speeds to accommodate the difference in speed between trains of dumper cars and to permit the movement of the dividers 34 to be halted, or shut off, while dumper cars are running but no loading of the dumper cars is taking place. Further still, the reversibility of the motor 70 accommodates the reversal of direction of the dividers 34 along the track 64 to accommodate the reversal of direction of the dumper cars 26 along the track 50, as well as accommodates an adjustment in the speed of the dividers 34 along the track 64.

With reference still to FIG. 1, a divider-including system 20a can also be employed adjacent the railway car siding 30 for covering the spacings, indicated 29, defined between adjacent railway cars 28 as the railway cars 28 move through the dumping region 56. The system 20a includes a plurality of carriage-supported dividers 34a which are connected together in a continuous loop for movement along an oval-shaped track 64a. A motor 70a is drivingly connected to the dividers 34a for moving the dividers 34a in the direction of the arrow 82a. The movement and position of the dividers 34a along the track 64a is coordinated with the speed and direction of movement of the railway cars 28 along the siding track 30 so that as each spacing 29 moves in sequence through the dumping region 56, the spacing 29 is covered by a corresponding divider 34a. If desired, an operator control tower 71 can be mounted adjacent the dump region 56 to enable an operator to visually monitor the dumping operations in the region 56.

Figure 7:
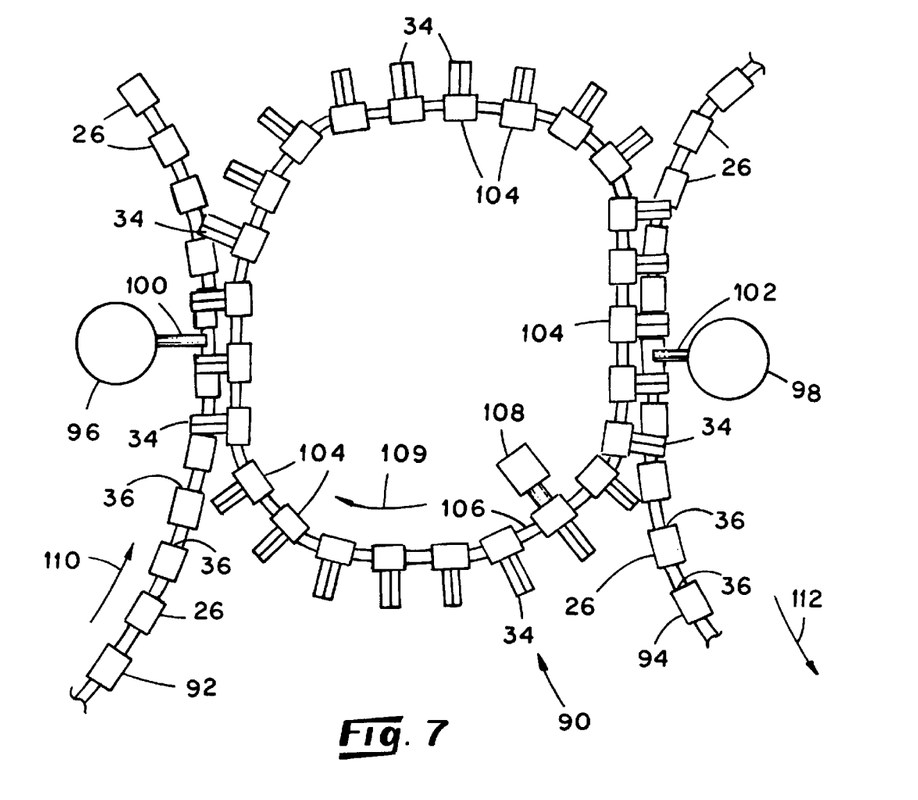
FIG. 7 is a view, similar to that of FIG. 1, illustrating schematically an alternative embodiment of a coal-loading system within which a divider mechanism is used.

With reference to FIG. 7, there is illustrated a plan view of another embodiment, generally indicated 90, of a dumper car-loading system having an endless line of dividers 34 which are routed in a loop and which are positionable into registry with the spacings 36 defined between adjacent dumper cars 26 connected together in two separate lines, indicated 92, 94, of dumper cars 26. In this connection, the system 90 employs two hoppers 96, 98 wherein each hopper 96 or 98 has a chute 100 or 102 for discharging coal into the open top of the dumper cars 26 disposed in the lines 92, 94 of dumper cars 26. Therefore, the hopper 96 and associated chute 100 provides a load site for the dumper cars 26 arranged in one line 92 of dumper cars 26, while the other hopper 98 and associated chute 102 provides a load site for the dumper cars 26 arranged in the other line 94 of dumper cars 26. As are the dividers 34 of the embodiment 20 of FIGS. 1–6, the dividers 34 of the FIG. 7 embodiment 90 are attached to the bodies of connected wheeled carriages 104 for rolling movement along a track 106. Motive means 108 are connected in driving relationship with the carriages 104 for moving the carriages 104, and thus the dividers 34, along the track 106.

During use of the embodiment 90, the dumper cars 26 are moved along their corresponding tracks in the directions of the corresponding arrows 110 and 112 and the carriages 104 of the depicted system 90 are moved along the track 106 in the direction of the arrow 109 at about the same speed that each line 92 or 94 of dumper cars 26 is being moved along its corresponding track. Meanwhile, the positions of the dividers 34 of the system 90 are coordinated with the positions of the spacings 36 defined between adjacent dumper cars 26 moved beneath the corresponding chutes 100 or 102 so that as the spacings 36 are moved beneath this chutes 100, 102, the dividers 34 span and thereby cover the spacings 36 so that no coal is permitted to fall into the spacings 36. Instead and by virtue of the disposition of each divider 34 in vertical registry with both the flow of material falling from a chute 100 or 102 and the spacing 36 defined beneath adjacent dumper cars 26 as the spacing 36 is moved beneath the chute 100 or 102, the flow of coal which falls from the chute 100 or 102 and onto the divider 34 is diverted along its flow-directing surfaces into either the (leading or trailing) dumper car disposed immediately ahead of or immediately behind the spacing 36.

Figure 8:
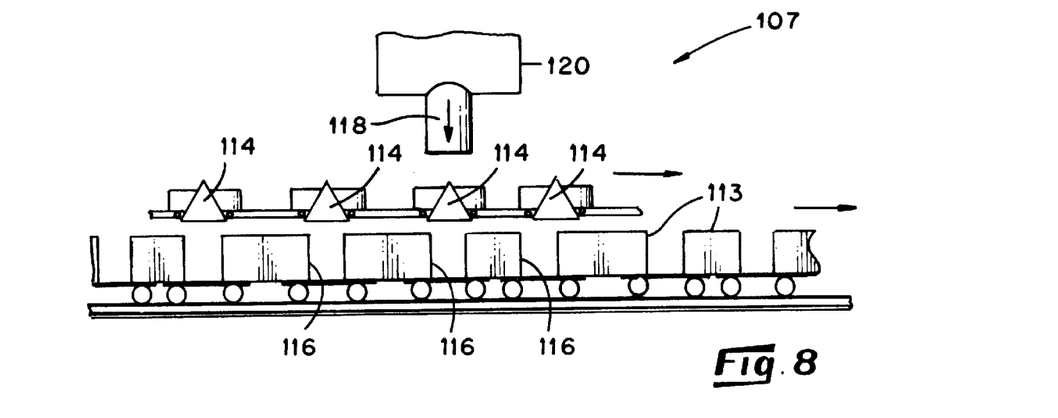
FIG. 8 is a view similar to that of FIG. 5 illustrating schematically still another embodiment of a coal-loading system within which a divider mechanism is used.

Although the dumper cars 26 of the embodiments of FIGS. 1–7 have been shown and described as being substantially equal in length to every other dumper car 26 in its corresponding line of dumper cars 26, the invention described herein can be used in conjunction with open-topped receptacles of different lengths. For example, there is illustrated in FIG. 8, a loading system 107 including a connected line of track-supported dumper cars 113 whose top openings are of different lengths, and there is disposed above the dumper cars 113 a connected line of dividers 114 which are each disposed in vertical registry with a corresponding spacing, indicated 116, defined between adjacent dumper cars 113 as the cars 113 pass in sequence beneath the discharge chute 118 of a hopper 120.

Figure 9:
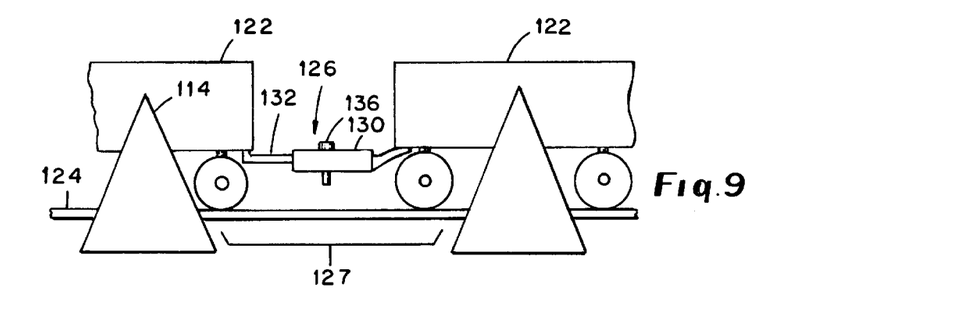
FIG. 9 is a view of a fragment of the FIG. 8 system, but drawn to a slightly larger scale.
Figure 10:
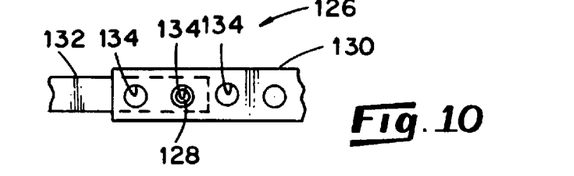
FIG. 10 is a plan view of the hitch pin arrangement of FIG. 9, as seen from above in FIG. 9 but without the hitch pin being installed therein.

With reference to FIGS. 9 and 10 and to compensate for the difference in length of the dumper cars 113, and hence the difference between successive spacings 116 defined along the line of cars 113, each divider 114 is rollably mounted upon a wheeled carriage 122 which, in turn, is supported upon a track 124 for rolling movement thereal-ong. The carriages 122 are connected together by a way of a hitch pin arrangement, generally indicated 126, which permits the spacing, indicated 127, as measured between successive dividers 114 in the line of dividers 114 to be altered. In this connection, the hitch pin arrangement 126 includes an elongated, hollow connector member 130 which is pivotally joined to so as to project rearwardly of one (i.e. a leading) carriage 122 and a bar 132 which is pivotally joined to so as to project forwardly of the following (i.e. a trailing) carriage 122 for connection to the connector member 130 in a male/female relationship. The bar 132 has a vertical opening 128 provided in a forward end thereof, and the connector member 130 is provided with a plurality of vertically-aligned sets of openings 134 disposed along its length.

The bar 132 and connector member 130 are releasably joined together by means of a hitch pin 136 which is insertable through the bar opening 128 and a set of openings 134 when positioned in an aligned relationship. Therefore, the distance between the adjacent dividers 114 in the line of dividers 114 can be adjusted by removing the hitch pin 136 from the bar 132 and connector member 130, shifting the bar 132 along the length of the connector member 130 so that the bar opening 128 is aligned with an alternative set of connector member openings 134, and then re-installing the hitch pin 136 through the aligned openings 128, 134 to reconnect the hitch pin arrangement 126. If desired, the pin 136 of the arrangement 126 can be replaced with a spring-loaded pin (not shown) which remains permanently fixed to the bar 132.

Figure 9A:
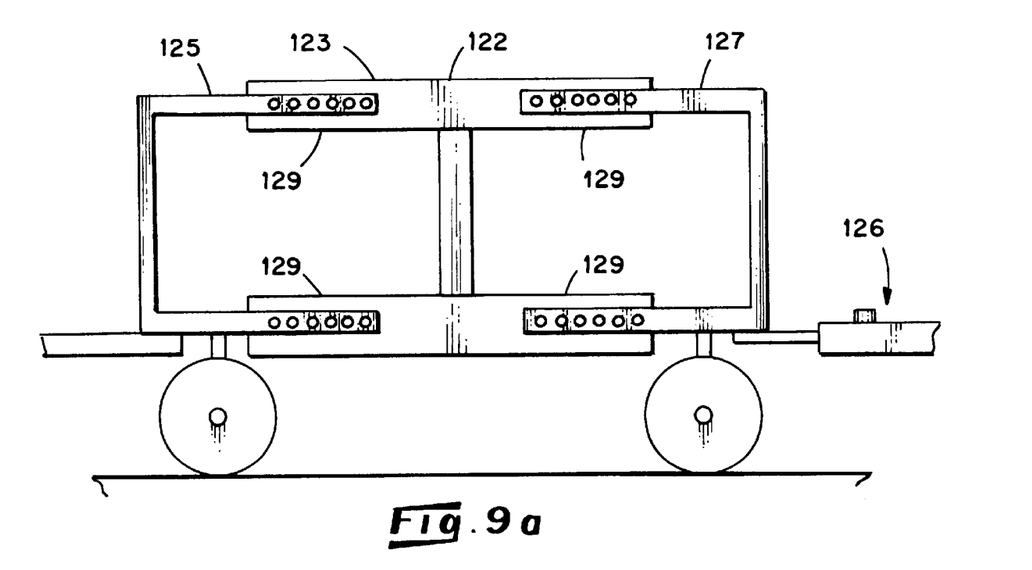
FIG. 9a is a side elevational view of the frame of a carriage of the FIG. 9 fragment.

It follows that if a train of dividers 114 are joined in a continuous loop and employ the adjustable-length arrangement 126 of FIGS. 9 and 10, an adjustment in the length of the arrangement 126 will necessitate a corresponding adjustment somewhere in the divider train so that the train length remains constant. For example, adjustments in the length of an arrangement 126 can be compensated for by adjusting the length of a carriage upon which a divider is mounted. To this end, there is schematically illustrated in FIG. 9a, the frame of a carriage 122 having a central section 123 to which the divider 114 (FIG. 9) is directly attached and end sections 125 and 127 which are connected to the central section 123 for movement relative to the central section 123 between extended and retracted conditions. To accommodate the shifting of the position of the end sections 125 and 127 relative to the central section 123, the end sections 125, 127 and central section include cooperating arrangements 129 having adjustable sections (like that of the aforedescribed arrangement 126) which permit the arrangements 129 to be lengthened or shortened.

Figure 11:
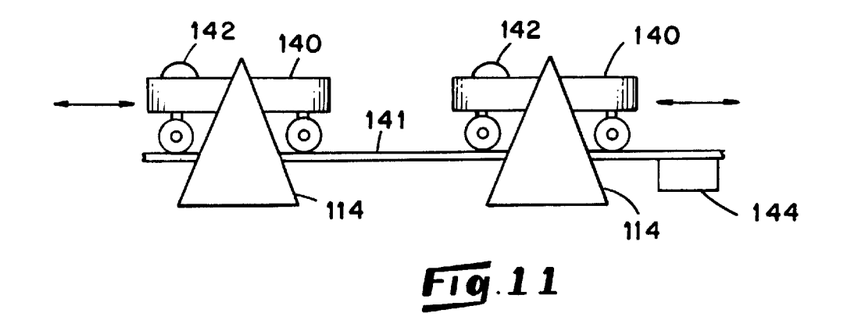
FIG. 11 is a side elevational view of another embodiment of a divider mechanism.

Further still and with reference to FIG. 11, the connected carriages 22 and 122 of the loading systems of the embodiments of FIGS. 1–10 can be replaced with wheeled carriages 140 which are not connected together at all and are each powered (i.e. moved) along its underlying track 141 by means of a motor 142 which is supported by its corresponding carriage 140 and is connected in driving relationship with the wheels of the carriage 140. For operation of a loading system which utilizes such independently-driven carriages 140, a distance controlling and monitoring means, indicated 144 in FIG. 11, is utilized and mounted adjacent the track 141 for monitoring the length of a receptacle expected to pass beneath a load site and for controlling the speed and position of a corresponding divider 114 desired to move through the load site in vertical registry with the spacing expected to follow the receptacle whose length is being measured. Such distance controlling and monitoring means 144 can include a signal emitter and an attending signal receiver.

Figure 12:
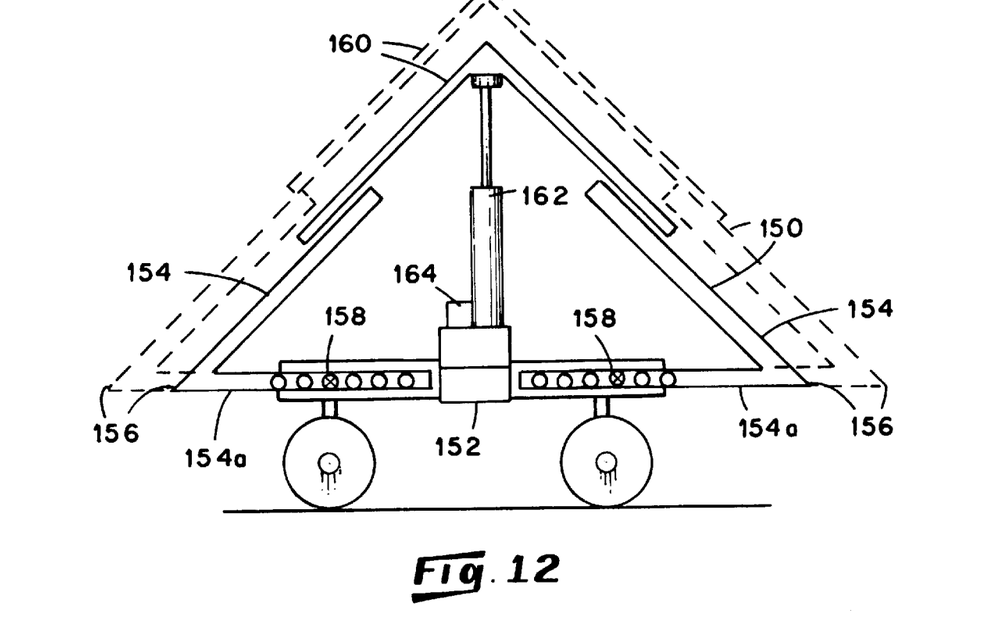
FIGS. 12 and 13 are views similar to that of FIG. 11 of other embodiments of divider mechanisms.

Yet still further, dividers utilized in loading systems embodying features of the present invention can be constructed so as to be capable of being altered in size to accommodate (and cover) spacing between adjacent open-topped receptacles wherein the spacings are of different length (as measured between the open-topped receptacles). More specifically, such dividers can be altered in length so that the discharge ends of the flow-directing surfaces defined thereby can be moved closer together or further apart. For example, there is illustrated in FIG. 12 a schematic cross sectional view of a divider 150 having a base 152, two V-shaped members 154 having a lower leg 154a which is slidably joined to the base 152 for movement of the tips, indicated 156, of the Vs of the members 154 closer together or further apart (between, for example, the position illustrated in solid lines in FIG. 12 and the position illustrated in phantom in FIG. 12) and pins 158 for releasable securing the members 154 in a fixed relationship relative to the base 152. In addition, an inverted V-member 160 is supported by a ram of a jack 162 which, in turn, is fixedly supported upon the base 152. One leg (i.e. the right leg) of the member 160 and one leg (i.e. the upper) of one V-shaped member 154 (i.e. the right V-shaped member 154) provides the forward, or leading, flow-directing surface of the divider 150 while the other leg (i.e. the left) of the member 160 and one leg (i.e.

the upper leg) of the other (the upper) leg of the V-shaped member 154 provides the rearward, or trailing, flow-directing surface of the divider 150.

To adjust the length of the divider 150, the jack 162 is actuated (by way of a motor 164) to raise or lower the inverted V-member 160, and the tips of the V-shaped members 154 are moved closer together or farther apart (by removal of the pins 158 and adjustment of the position of the lower legs 154a relative to the base 152) so that the upper legs thereof are positioned in close proximity to the corresponding legs of the inverted V-member 160. It follows that by actuating the jack 162 and shifting the position of the V-members 154 relative to the base 152 by a corresponding amount, the height of the divider 150 is altered, the length of the flow-directing surfaces of the divider 150 are modified, and the length of the divider 150 as measured between the discharge ends (i.e. the tips 156) of the flow-directing surfaces is adjusted. Such an adjustability feature permits the dividers 150 to accommodate (and thereby span) spacings between adjacent open-topped receptacles having different lengths and permits the dividers 150 to circumvent potential obstacles which may be encountered at various points along the divider train. Furthermore, such an adjustability feature also permits the shape or size of the divider to be adjusted as needed for use with particulate material of different physical qualities.

Figure 13:
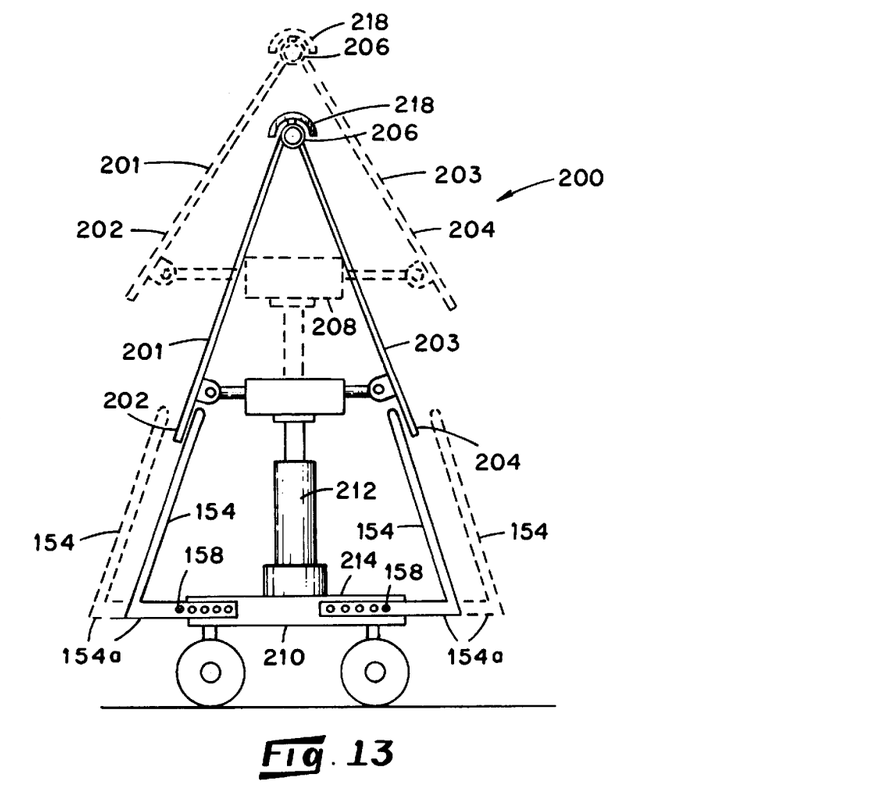

With reference to FIG. 13, there is illustrated an alternative divider 200 having a pair of flow-directing surfaces 201 and 203 which include a pair of arms 202 and 204 arranged to form an inverted V. The upper ends of the arms 202 and 204 are hingedly connected to one another at a hinge 206 to accommodate a pivotal movement of the lower ends of the arms 202 and 204 between alternative positions, such as the position illustrated in solid lines in FIG. 13 and the position illustrated in phantom in FIG. 13. To prevent particulate material which is deposited upon the divider 200 from damaging the hinge 206, the hinge 206 can be covered with a protective shroud 218 which extends along the length of the hinge 206. In addition, a double-acting hydraulic cylinder 208 is connected so as to act between the lower ends of the arms 202 and 204 and is appropriately connected to a source of pressurized fluid mounted upon the associated carriage 210, and a pair of adjustable V-members 154 (comparable to the V-members 154 of the FIG. 12 divider 150) are joined to the base of the carriage 210 to provide the lower surfaces of the flow-directing surfaces 201 and 203.

By actuating the cylinder 208 so that its rams move into or out of its cylinder between extended or retracted positions, the lower ends of the arms 202 and 204 move toward or away from one another between the FIG. 13 solid and phantom-line positions and thereby alter the distance between the discharge ends of the divider flow-directing surfaces 201 and 203. By supporting the divider upon a jack 212 which is, in turn, supported upon a base 214 suitably supported by the associated carriage 210, the divider 200 can be raised or lowered relative to the base 214 and thereby alter the height of the divider 200 as measured from the base 214. The position of the V-members 154a can be adjusted relative to the remainder of the carriage 210 to compensate for a change in the height of the divider 200.

Figure 14:
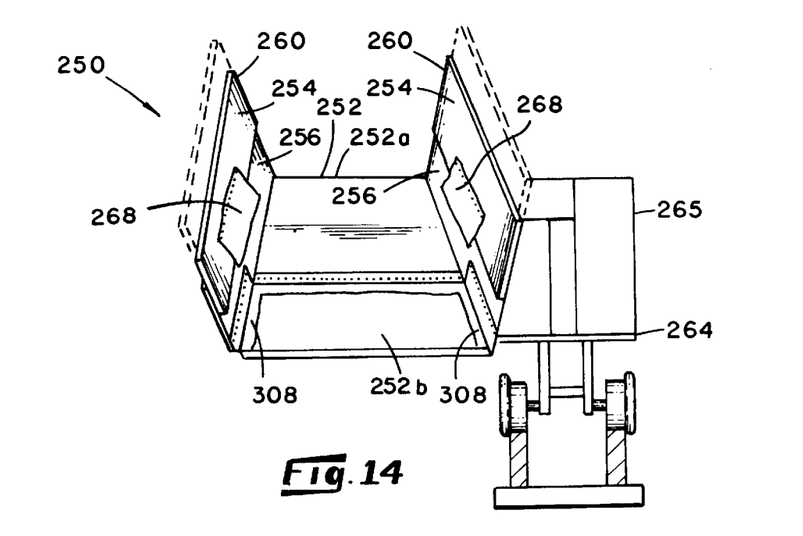
FIG. 14 is an end view of a further embodiment of a divider mechanism.
Figure 14A:
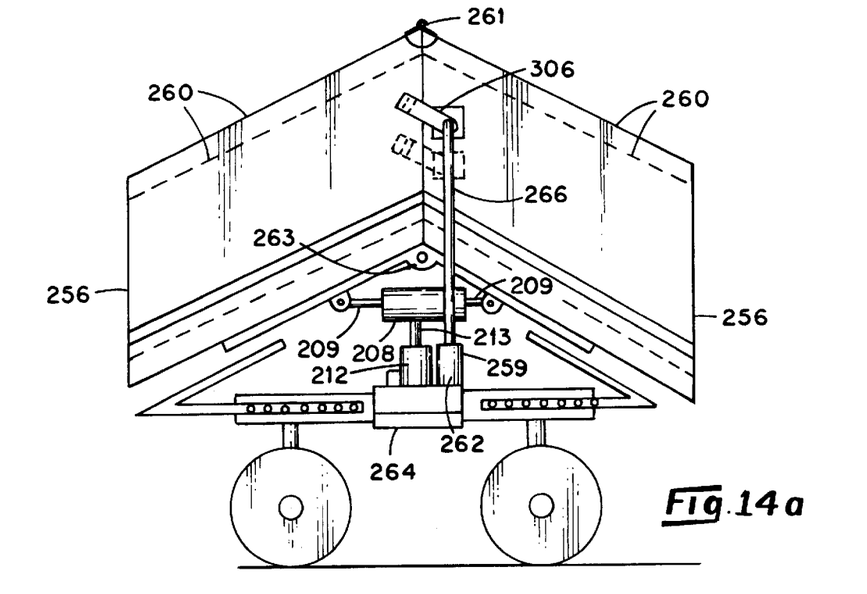
FIG. 14a is a side elevational view of the embodiment of FIG. 14 as seen generally from the left in FIG. 14.

With reference to FIGS. 14 and 14a, there is illustrated still another embodiment, indicated 250, of a divider having a pair of flow-directing surfaces 252 (only one shown in FIG. 14) having upper and lower surface portions 252a and 252b that are bordered by a pair of sideboard assemblies 254 for channeling the flow of coal along the length of the surfaces 252. The sideboard assemblies 254 of the depicted embodiment 250 are adjustable in height to accommodate a variation in the amount of coal expected to be deposited upon the divider surfaces 252 and to effectively alter the width of the surfaces 252. To this end, each sideboard assembly 254 includes a lower sideboard member 256 which is attached to the side so as to extend along the length of each surface 252 and a upper sideboard member 260 which is supported atop the leg of a ram 266 of a height-adjusting jack 262 (FIG. 14a) which, in turn, is mounted upon the track-supported carriage, indicated 264, of the depicted divider mechanism 250. To offset the weight of the divider 250 mounted upon one side of the carriage 264, the carriage 264 is provided with a counterweight 265 mounted on the side of the carriage 264 opposite the divider 250.

The height-adjusting jack 262 includes a cylinder 259 which is fixed in position relative to the carriage 264, and the lower leg of a cylinder ram 266 is movable relative to the cylinder 259 between extended and retracted positions. By adjusting the position of the ram 266 relative to the cylinder 259 between, for example, the position illustrated in solid lines in FIG. 14a and the position illustrated in phantom in FIG. 14a, the upper sideboard member 260 slidably moves upwardly or downwardly, respectively, relative to the lower sideboard member 256 (between, for example, the illustrated solid-line and phantom-line positions of FIG. 14) to provide the sideboard assembly 254 with the desired height as measured from the surface 252. In the depicted divider mechanism 250, the sideboard assemblies 254 are canted outwardly as a path is traced upwardly from the surface 252 so that by raising or lowering the upper sideboard member 260, the width of the flow-directing surface 252 is increased or decreased, respectively. If desired, a dust cover 268 (FIG. 14) can be attached to the upper sideboard member 260 to cover any gap or spacing which exists between the upper and lower sideboard members 260 and 256, and a dust cover 308 can be attached along the lower sideboards 256 and/or the lower edge of the upper surface portion 252a to cover any gap or spacing which exists between the surfaces 252a, 252b and lower sideboard members 260.

Furthermore, the divider 250 can be provided with an adjustment arrangement embodied in the FIG. 12 carriage enabling the flow-directing surfaces 252 to be adjusted in length. Further still, the upper sideboard members 260 disposed on each side of the divider 250 can be connected along the tops thereof with a hinge 261 and the flow-directing surfaces 252 can be connected with a hinge 263 to permit the slope of the surfaces 252 relative to the horizontal to be altered. Along these lines, a double-acting cylinder 208 and a jack 212 (similar to those associated with the FIG. 13 carriage) are connected to the underside of the surfaces 252, and the double-acting cylinder 208 has rams 209 which when moved between a retracted and extended position, moves the hinged flow-directing surfaces 252 relative to one another about the hinge 263 to thereby alter the slope of the surfaces 252 relative to the horizontal.

Figure 14B:
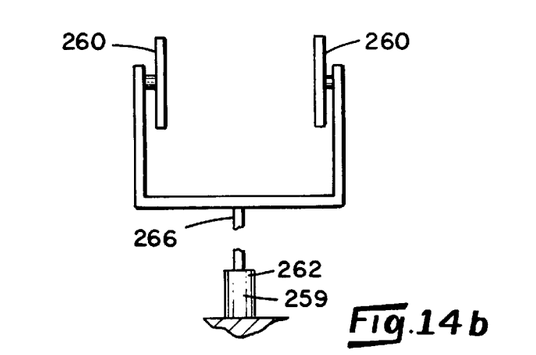

Furthermore, the aforementioned cylinder 259 having an upwardly-extending ram 266 (which is somewhat Y-shaped as viewed in FIG. 14b) is connected to the upper sideboard members 260 on each side of the divider mechanism 250 for raising and lowering the sideboard members 258, 260 by way of the upper sideboard member 260. In this connection, a motor and arm arrangement 306 is interposed between the sideboard member 260 and the upper end of the ram 266 so that the upward and downward movement of one (or the leading) sideboard member 260 (i.e. the rightwardmost member 260 as depicted in FIG. 14a) effects the corresponding (i.e. upward and downward) movement of and stabilizing of the other (or the trailing) sideboard member 260 (i.e. the leftwardmost member 260 as depicted in FIG. 14a). Meanwhile, the jack 212 has an upwardly-extending ram 213 which, when moved between retracted and extended conditions, bodily raises and lowers the flow-directing surfaces 252. It follows that a pivoting (or folding) or lengthening of the sideboard members could necessitate a corresponding, or offsetting, adjustment of the lower legs 154a of the V-shaped members 154.

The flow-directing surfaces of the aforedescribed dividers can be constructed out of any of a number of materials, such as steel, which is capable of resisting damage when particulate material is deposited thereon. If desired, the flow-directing surfaces can be lined with a hard plastic lining material, such as is available under the trade designations Hardliner from C.U.E., Inc. of Cranberry Township, Pennsylvania and Tivar from Menasha Corporation of Fort Wayne, Ind.

Figure 15:
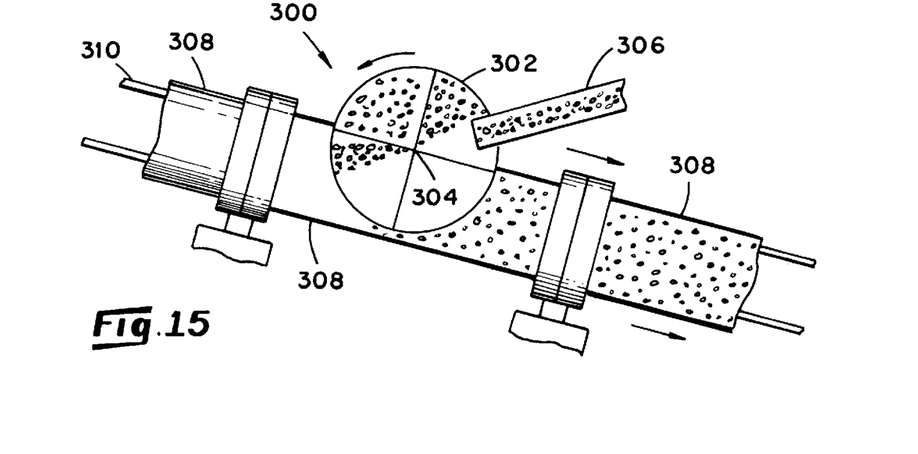
FIG. 15 is a plan view of another coal-loading site at which still another embodiment of a loading system is utilized.

It will be understood that numerous modifications and substitutions can be had with the aforedescribed embodiments without departing from the spirit of the invention. For example, although the aforedescribed divider embodiments have been shown and described as being utilized in connection with fixed point loading sites at which the particulate material is intended to fall vertically along a fixed path, a divider in accordance with the present invention can be utilized in connection with a loading system wherein the downward flow of particulate material from a source can be shifted or moved laterally relative to the vertical. For example, there is shown in FIG. 15 an embodiment of a loading system, generally indicated 300, which employs a rotary dumper 302 mounted for rotation about a vertical axis 304 for transferring coal which is deposited upon one side of the dumper 302 from a conveyor belt 306 into the tops of dumper cars 308 moving along a track 310 below the other side of the dumper 302. The depicted dumper 302 includes four compartments into which coal is deposited, and each compartment can be closed off (independently of the other compartments) to hold the coal deposited therein until the rotation of the dumper 302 moves the coal-holding compartment into about vertical registry with the top of a dumper car 308. During operation, coal is dumped from each dumper compartment while the dumper 302, as well as the dumper cars 308, are in motion, so that the path of the coal which falls from a dumper compartment follows a path which is canted with respect to the vertical. In any event, the dumper 302 provides a load point of increased area so that material of a given flow volume can fill the dumper cars 308 relatively quickly. Consequently, the use of the rotary dumper 302 may be preferred for increasing the load delivered to the dumper cars 308 without requiring that the dumper cars 308 be slowed down.

Figure 16:
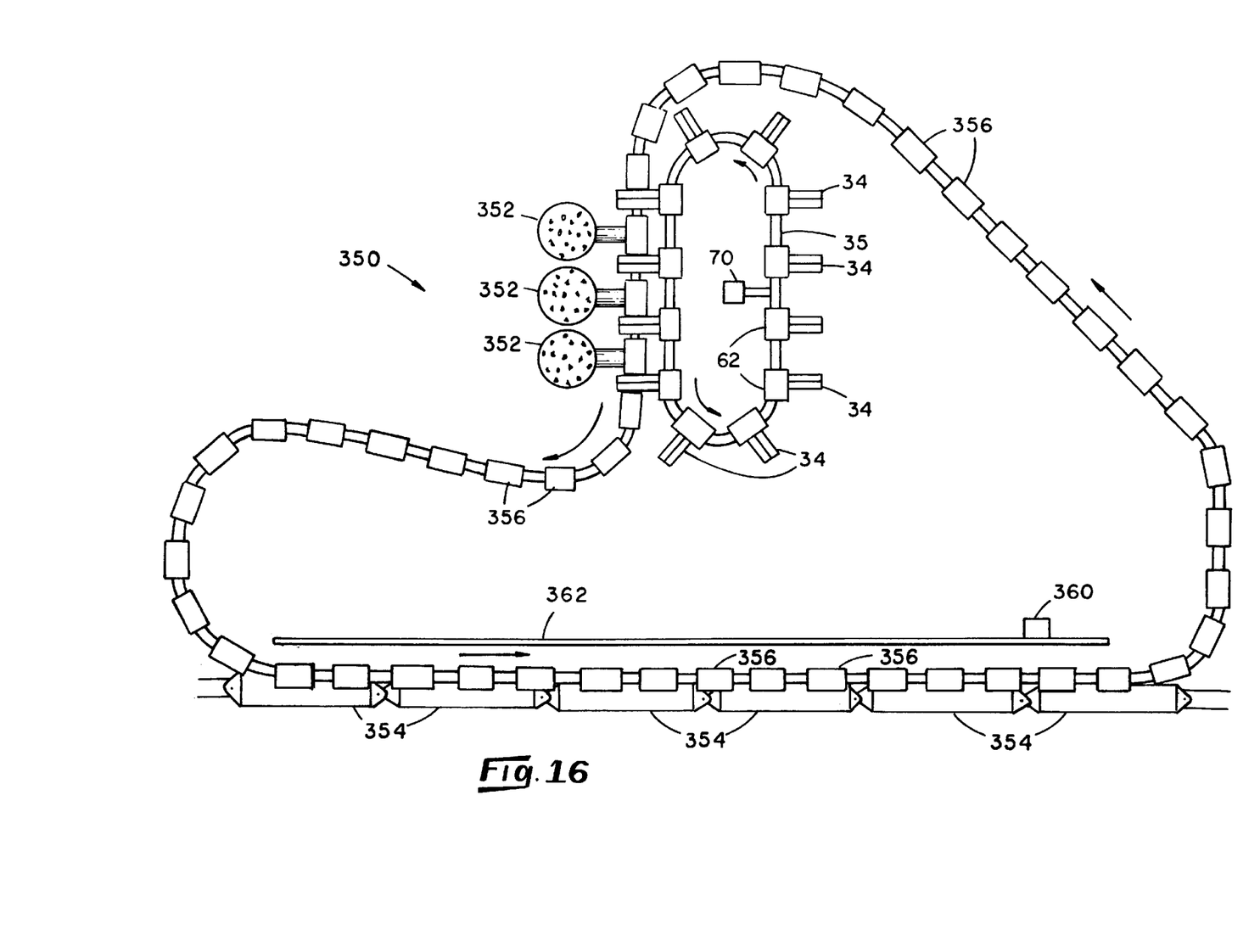
FIG. 16 is a plan view of a coal-loading site similar to that of FIG. 1 illustrating schematically one more embodiment of a coal-loading system which employs divider mechanisms during a coal-loading operation using stationary railway cars for use in a capacity-increasing mode.

Further still, although the FIG. 1 loading system 20 has been shown and described as being utilized for loading a series of railway cars which are in motion along a track, a loading system within which the present invention is embodied can be utilized for simultaneously or sequentially or in any order load a plurality of railway cars which are parked along a railway track. For example, there is shown in FIG. 16 a loading system 350 (employing several of the components as the FIG. 1 embodiment) for transferring coal from hoppers 352 to parked railway cars 354 by way of a connected line of dumper cars 356. An operator control station 360 is movably mounted upon a monorail 362 disposed adjacent the line of parked railway cars 354. Components of the FIG. 16 system 350 which are comparable to the FIG. 1 system 20 accordingly bear the same reference numerals. As is shown in FIG. 16, the railway cars 354 are parked along a siding and are in condition for accepting coal deposited therein from the dumper cars 356. Since the depicted FIG. 16 system 350 is capable of loading the cars 354 along the full length of the railway siding, the system 350 provides a loading scheme of increased loading capacity.

Accordingly, the aforedescribed embodiments are intended for the purpose of illustration and not as limitation.

What is claimed is:

1. A material transfer system for loading a pair of spaced receptacles with a material capable of gravitationally flowing toward the receptacles from a source and wherein the material which is gravitationally directed toward the receptacles moves unhaltingly along a path between the source and the receptacles which has a segment through which the material falls downwardly, and the spaced receptacles to be loaded define a spacing therebetween which is movable into vertical registry with the segment of the material flow path through which the material falls unhaltingly downwardly, the transfer system comprising:

an elongated support frame mounted adjacent the receptacles;

a divider mechanism providing two downwardly-directed flow-directing surfaces which are joined together at an apex and which diverge from one another as paths are traced downwardly along the flow-directing surfaces from the apex, and each flow-directing surface terminates at a discharge end from which material which falls upon the flow-directing surfaces is permitted to fall therefrom and move toward one of the receptacles to be loaded;

means for mounting the divider mechanism along the support frame for movement along the length thereof and into and out of a position at which the divider mechanism spans and thereby covers the spacing defined between the two receptacles; and means for moving the divider mechanism along the length of the support frame and into a position at which the divider mechanism is positionable in vertical registry with the segment of the material path through which the material falls unhaltingly downwardly so that when the spacing defined between the receptacles is moved in vertical registry with the segment of the material flow path through which the material falls unhaltinaly downwardly, the divider mechanism is positionable in registry with the segment of the material flow path through which the material falls unhaltingly downwardly so that the material is prevented from falling into the spacing by the divider mechanism.

2. The system as defined in claim 1 wherein the divider mechanism is in the form of a wedge-shaped body having two sides which are joined at an apex and depend generally downwardly therefrom and terminate at lower ends, each of the two sides of the wedge-shaped body provides a flow-directing surface of the divider mechanism and the lower ends of the sides of the wedge-shaped body provides the discharge ends of the flow-directing surface off of which the material which is deposited onto the flow-directing surfaces is discharged from the divider mechanism.

3. The system as defined in claim 2 wherein the discharge ends of the flow-directing surfaces are spaced from one another by a distance which is at least as great as the distance across the space defined between the two receptacles to be located.

4. The system as defined in claim 1 wherein the support means includes an elongated guideway, and the divider mechanism is mounted for movement in either of two directions along the length of the guideway.

5. The system as defined in claim 4 further including a wheeled carriage which is movably mounted upon the guideway for rolling movement therealong and the moving means includes a motor connected in driving relationship with the wheels of the carriage so that actuation of the motor effects the movement of the divider mechanism along the length of the guideway.

6. The system as defined in claim 1 wherein the receptacles to be loaded are railway cars and the material to be loaded into the railways cars is coal.

7. A system for loading a pair of spaced, open-topped receptacles with particulate or other fluid material which is gravitationally directed toward the open tops of the receptacles from a source and wherein the material which is gravitationally directed toward the receptacles moves unhaltingly along a path between the source and the receptacles which has a segment through which the material falls freely and unhaltingly downwardly, and the spaced receptacles to be loaded define a spacing therebetween which is movable into vertical registry with the segment of the material flow path through which the material falls freely and unhaltingly downwardly, the system comprising:

a elongated support frame positioned adjacent the spaced receptacles to be loaded;

a divider mechanism including means providing two flow-directing surfaces for accepting material falling therein along the segment of the material flow path through which the material falls freely downwardly, each flow-directing surface having a top and a lower discharge edge and the tops of the two flow-directing surfaces are joined together at an apex, and the lower discharge edges of the flow-directing surfaces are spaced from one another;

means for mounting the divider mechanism upon the support frame for movement along the length thereof and so that the divider mechanism is positionable in vertical registry with the segment of the material flow path along which the material is permitted to fall downwardly; and means for moving the divider mechanism along the length of the support frame to accommodate movement of the flow-directing surfaces into and out of registry with the segment of the material flow path through which the material falls freely and unhaltingly downwardly so that when the spacing defined between the receptacles is moved into vertical registry with the segment of the material flow path through which the material falls unhaltingly downwardly and the divider mechanism is positionable into registry with the segment of the material flow path through which the material falls unhaltingly downwardly, the falling material is prevented from falling into the spacing by the divider mechanism.

8. The system as defined in claim 7 wherein the divider mechanism is in the form of a wedge-shaped body having two sides which are joined at an apex and depend generally downwardly therefrom and terminate at lower ends, each of the two sides of the wedge-shaped body provides a flow-directing surface of the divider mechanism and the lower ends of the sides of the wedge-shaped body provides the discharge ends of the flow-directing surface off of which the material which is deposited onto the flow-directing surfaces is discharged from the divider mechanism.

9. The system as defined in claim 7 wherein the support means includes an elongated guideway, and the divider mechanism is mounted for movement in either of two directions along the length of the guideway.

10. The system as defined in claim 9 further including a wheeled carriage which is movably mounted upon the guideway for rolling movement therealong and the moving means includes a motor connected in driving relationship with the wheels of the carriage so that actuation of the motor effects the movement of the divider mechanism along the length of the guideway.

11. The system as defined in claim 7 wherein the discharge edges of the flow-directing surfaces are spaced from one another by a distance which is at least as great as the distance across the space defined between the two receptacles to be loaded.

12. The system as defined in claim 7 wherein the receptacles to be loaded are railway cars and the fluid material to be loaded into the railway car is coal.

13. The system as defined in claim 7 wherein the spaced, open-topped receptacles are connected in a line of at least three open-topped receptacles comprising a first and second adjacent pair of receptacles and wherein a spacing is provided between each adjacent pair of receptacles, the divider mechanism is first divider for spanning and covering the spacing provided between the first pair of adjacent receptacles when the spacing provided between the first pair of adjacent receptacles is moved into vertical registry with the flow segment through which the material falls freely downwardly, and the system further includes a second divider mechanism for spanning and covering the spacing provided between the second pair of adjacent receptacles when the spacing provided between the second pair of adjacent receptacles is moved into vertical registry with the flow segment through which the material falls freely downwardly.

14. The loading system as defined in claim 13 wherein the divider mechanisms are connected together in a line so that movement of one divider along the length of the support frame effects the movement of the other divider mechanism along the length of the support frame.

15. The loading system as defined in claim 14 further including adjustment means associated with the divider mechanism permitting the distance between adjacent divider mechanism to be adjusted to accommodate receptacles of different length.

16. The loading system as defined in claim 13 wherein the divider mechanisms are connected together along a continuous loop so that movement of one divider mechanism along the length of the support frame effects the movement of the other divider mechanism along the length of the support frame.

17. The loading system as defined in claim 7 wherein the length of the divider mechanism as measured between the discharge ends thereof can be adjusted to accommodate a difference in the length of the spacing defined between adjacent open-topped receptacles.

18. The loading system as defined in claim 7 wherein the height of the divider system as measured between the elevation of the apex of the divider mechanism and the elevation of the lower discharge edges of the divider mechanism can be adjusted.

19. The loading system as defined in claim 7 wherein the width of the divider mechanism as measured across the flow-directing surfaces can be adjusted.

20. The loading system as defined in claim 7 wherein the divider mechanism includes means providing sideboards which bound the flow-directing surfaces so as to provide a flow channel therealong.

21. The loading system as defined in claim 20 wherein the sideboards are adjustable in height as measured vertically from the flow-directing surfaces.

22. The loading system as defined in claim 7 wherein the receptacles to be loaded are adapted to move along a guideway as the receptacles receive material gravitationally directed therein, and the system further includes means for coordinating the movement of the divider mechanism in conjunction with the movement of the receptacles so that the divider mechanism remains in vertical registry with the spacing defined between adjacent receptacles as the receptacles receive material gravitationally directed therein.

* * * * *